United States Patent [19]
Hirose et al.

[11] Patent Number: 4,938,586
[45] Date of Patent: Jul. 3, 1990

[54] INFORMATION PROJECTING APPARATUS

[75] Inventors: Yoshiko Hirose, Yokohama; Noboru Koumura, Narashino; Tadashi Sato, Kokubunji; Shigeru Sugita, Sayama; Yasutoshi Sugita, Tokyo, all of Japan

[73] Assignee: Canon Kabushiki Kaisha, Tokyo, Japan

[21] Appl. No.: 168,602

[22] Filed: Mar. 4, 1988

Related U.S. Application Data

[63] Continuation of Ser. No. 799,095, Nov. 18, 1985, abandoned.

[30] Foreign Application Priority Data

Dec. 7, 1984 [JP] Japan .................. 59-258564
Dec. 13, 1984 [JP] Japan .................. 59-189444[U]
Dec. 13, 1984 [JP] Japan .................. 59-275548

[51] Int. Cl.$^5$ ............................. G03B 23/08
[52] U.S. Cl. ...................... 353/26 A; 242/67.3 R; 242/180; 352/123; 353/27 A; 353/25
[58] Field of Search .............. 353/25, 26 R, 26 A, 353/27 R, 27 A, 95, 103, 118, 122; 242/180, 181, 67.3, 55.18; 226/110; 350/582; 352/72, 73, 78 R, 78 C, 123, 8, 244; 15/209 R, 210 R, 1.5; 248/345.1, 621, 633, 519

[56] References Cited

U.S. PATENT DOCUMENTS

| | | | |
|---|---|---|---|
| 2,606,409 | 8/1952 | Gordon | 352/244 |
| 3,144,228 | 8/1964 | Kass | 248/633 |
| 3,164,059 | 1/1965 | Turrentine | 353/26 A |
| 3,179,001 | 4/1965 | Silverman | 353/26 A |
| 3,456,817 | 7/1969 | Irazoqui | 221/79 |
| 3,614,022 | 10/1971 | Henriksen | 242/198 |
| 3,646,258 | 2/1972 | Lemelson | 178/6.6 A |
| 3,945,647 | 3/1976 | Rangabe | 15/1.5 R |
| 4,025,176 | 5/1977 | Lopata | 353/26 A |
| 4,160,169 | 7/1979 | Endicott et al. | 353/26 A |
| 4,273,427 | 6/1981 | Bailey | 353/27 A |
| 4,353,642 | 10/1982 | Weigert | 353/25 |
| 4,357,615 | 11/1982 | Yoshiharu | 15/210 R |
| 4,462,056 | 7/1984 | Kara | 360/128 |
| 4,470,089 | 9/1984 | Hutchins et al. | 360/128 |
| 4,498,114 | 2/1985 | Davis | 360/128 |

Primary Examiner—Allan N. Shoap
Assistant Examiner—Patrick R. Scanlon
Attorney, Agent, or Firm—Fitzpatrick, Cella, Harper & Scinto

[57] ABSTRACT

An information projecting apparatus for selecting one of a plurality of cartridge each containing an information recording medium therein and projecting the information of the recording medium in the selected cartridge has cartride storing device for storing the plurality of cartridges therein, cartridge conveying device for conveying the cartridge selected from the cartridge storing device to a first position or a second position, feeding device for feeding to a projecting portion the recording medium of the cartridge placed at the first position or the second position, and optical device for projecting the information of the recording medium placed at the projecting portion.

25 Claims, 9 Drawing Sheets

INFORMATION PROJECTING APPARATUS

This application is a continuation of application Ser. No. 799,095 filed 11/18/85, and now abandoned.

BACKGROUND OF THE INVENTION

1. Field of the Invention

This invention relates to an information projecting apparatus storing therein a plurality of cartridges each containing an information recording medium such as a microfiche or roll film therein.

2. Description of the Prior Art

The apparatus of this type is comprised of a cartridge interchanging device for selecting a desired cartridge from a storing portion storing therein a plurality of film cartridges each containing a microfiche or roll film therein and conveying this cartridge to a projecting portion, and a film retrieving and projecting device for automatically feeding out a film from the selected cartridge, retrieving a desired image and stopping the film at a predetermined projecting position, and projects the retrieved image of the film onto the screen of the projecting portion or projects said retrieved image onto a photosensitive member, thereby obtaining a copy.

In the film projecting apparatus of this type, the microfilm of the selected cartridge is utilized in the projecting portion, whereafter the film is rewound into the cartridge, and this cartridge is returned to its original place in the storing portion, and then a new cartridge to be used next time is selected and conveyed to the projecting portion. Therefore, much time is required before the new cartridge becomes utilizable, and the apparatus cannot be utilized during the return of the used cartridge and during the selection and conveyance of the new cartridge, and this has led to a disadvantage of low working efficiency.

Also, generally in the film projecting apparatus, a film feeding path is disposed at a location which can be seen from outside or a location into which ambient dust or the like is liable to enter and therefore, dust or the like is liable to adhere to a film feeding mechanism and a film guide member disposed along the feeding path. When such dust or the like adheres to the image portion of the film, it is enlargedly projected onto the screen or the photosensitive member by a projection lens, and this has led to a problem that the projected image on the screen cannot be read rightly or a copy image of low quality is made or the film is injured.

Also, the cartridge interchanging device is provided with a cartridge storing portion storing a number of cartridges therein, a cartridge conveying member for taking out a designated particular cartridge from the storing portion, conveying and charging the particular cartridge into the cartridge charging portion of the projecting apparatus and returning it to the storing portion, and an apparatus operation control circuit portion including necessary cartridge designating means.

Now, in the conventional cartridge interchanging device, when the cartridge conveying member is to be moved up and down, a wire or rope connecting the cartridge conveying member to a motor is driven to thereby move the cartridge conveying member up and down, and this has led to a problem that the cartridge conveying member may fall and the damaged when the main switch is opened or the wire breaks during the upward and downward movement of the cartridge conveying member.

SUMMARY OF THE INVENTION

It is an object of the present invention to eliminate the above-noted disadvantages and to provide an information projecting apparatus which permits a number of cartridges to be automatically interchanged and utilized.

It is another object of the present invention to provide an information projecting apparatus in which a cartridge to be used next time is made utilizable in a short time after the utilization of a first cartridge has been terminated.

It is still another object of the present invention to provide an information projecting apparatus in which the non-utilization period of the projecting portion is shortened to enable the apparatus to be efficiently utilized.

It is yet still another object of the present invention to provide a film projecting apparatus in which the film feeding path can be simply cleaned.

It is a further object of the present invention to provide a cartridge interchanging device in which the cartridge conveying member is prevented from being damaged.

DESCRIPTION OF THE PREFERRED EMBODIMENT

Figure 1:
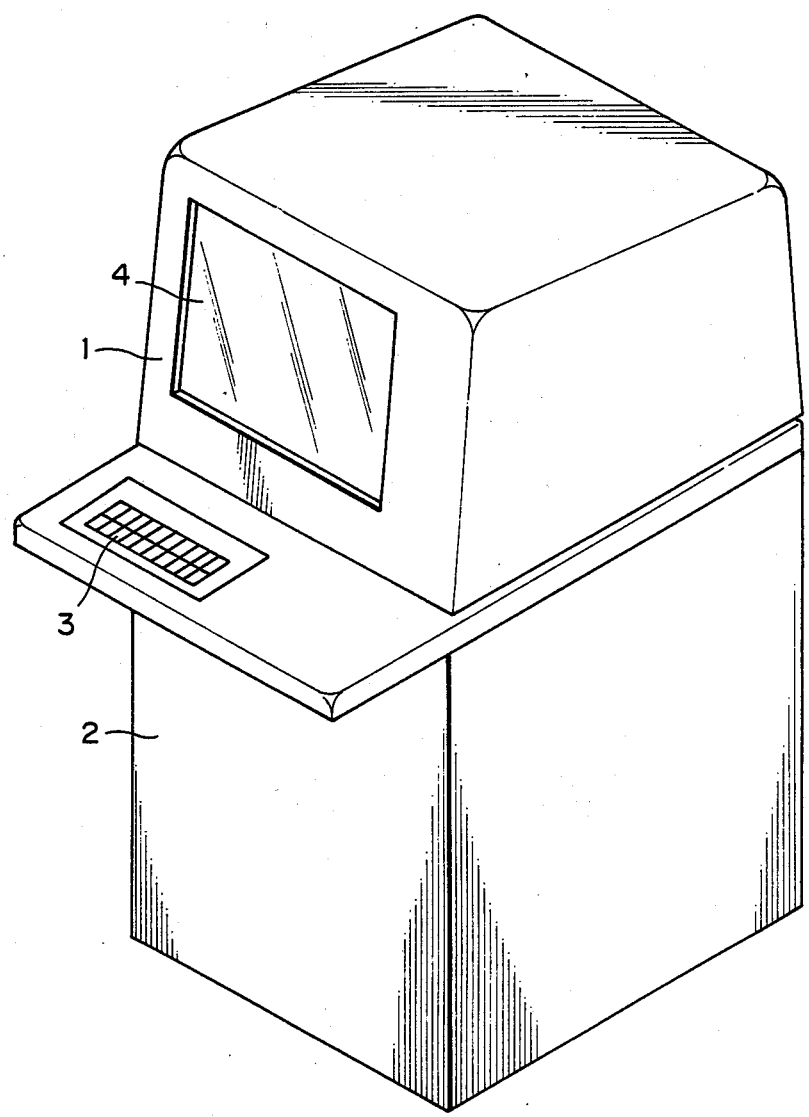
FIG. 1 is a view showing the appearance of a film reader-printer provided with the apparatus of the present invention.

The present invention will hereinafter be described with respect to an embodiment thereof shown in the drawings.

FIG. 1 shows a film reader-printer provided with the device of the present invention. The entire apparatus is comprised of an upper housing 1, a lower housing 2 and an operating board 3 for instructing various operations. A screen 4 is provided on the front face of the upper housing 1.

Figure 2:
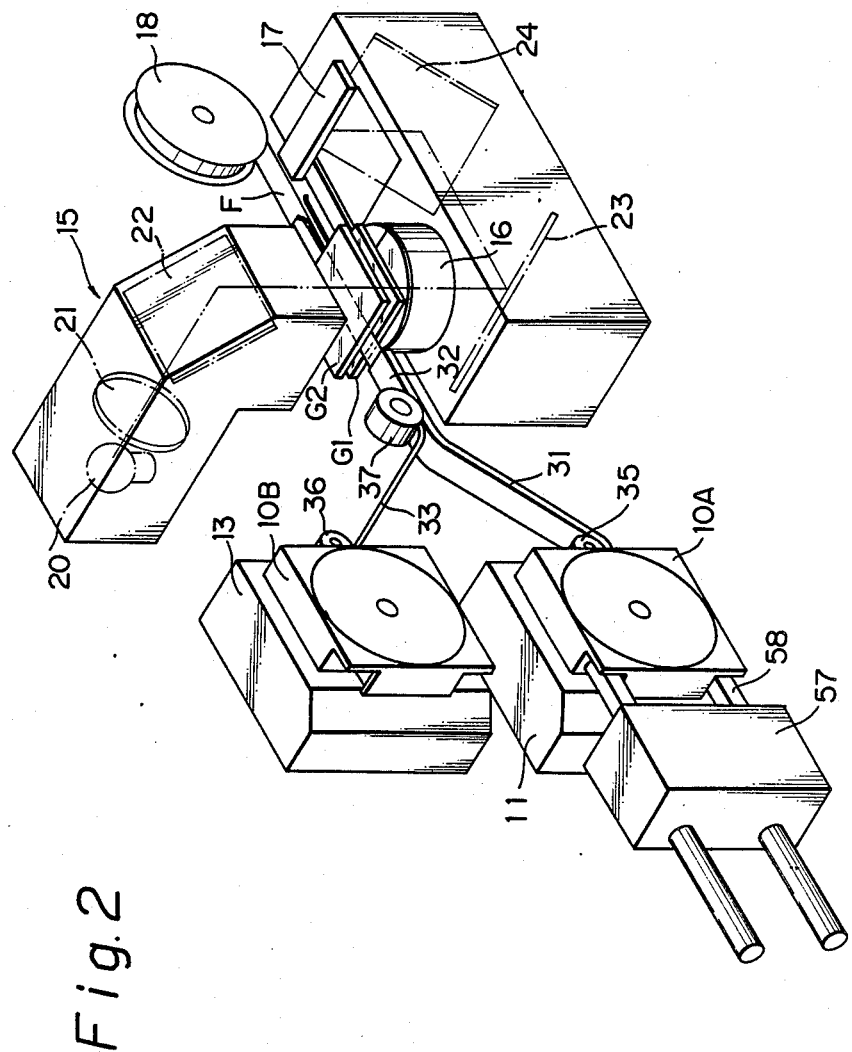
FIG. 2 is a perspective view showing the interior of an upper housing.

As shown in FIG. 2, within the upper housing 1, there are disposed a first cartridge receiving member 11 for holding in a first position a first cartridge 10A automatically selected from a cartridge storing portion in the lower housing 2 which will later be described, a second cartridge receiving member 13 for holding in a second position a second cartridge 10B automatically selected from the cartridge storing portion, an illuminating portion 15 for illuminating a microfilm fed out from the cartridge 10A or 10B, an imaging lens 16, an image sensor 17, a take-up reel 18, etc. The second cartridge receiving member 13 is installed above the first cartridge receiving member 11.

The illuminating portion 15 is comprised of a lamp 20, a condenser lens 21 and a mirror 22, and the light from the lamp 20 is projected onto a microfilm F placed between a pair of glass plates G1 and G2, through the condenser lens 21 and via the mirror 22. The light transmitted through the microfilm passes through the imaging lens 16, is reflected by mirrors 23 and 24 and is projected onto the image sensor 17. The image sensor 17 comprises a light-receiving element array such as CCD and converts the images on the microfilm into electrical signals. The image signal put out from the image sensor is processed by a signal processing circuit, whereafter it is sent to a conventional printer such as a laser beam printer and a copy image is obtained by the printer. Where said apparatus is used as a reader, the light passed through the imaging lens 16 is projected onto the screen 4 through an optical system, not shown, and the images on the microfilm are observed on the screen. In place of the image sensor 17, a conventional photosensitive member may be disposed at this position so that copying may be effected.

Figure 3:
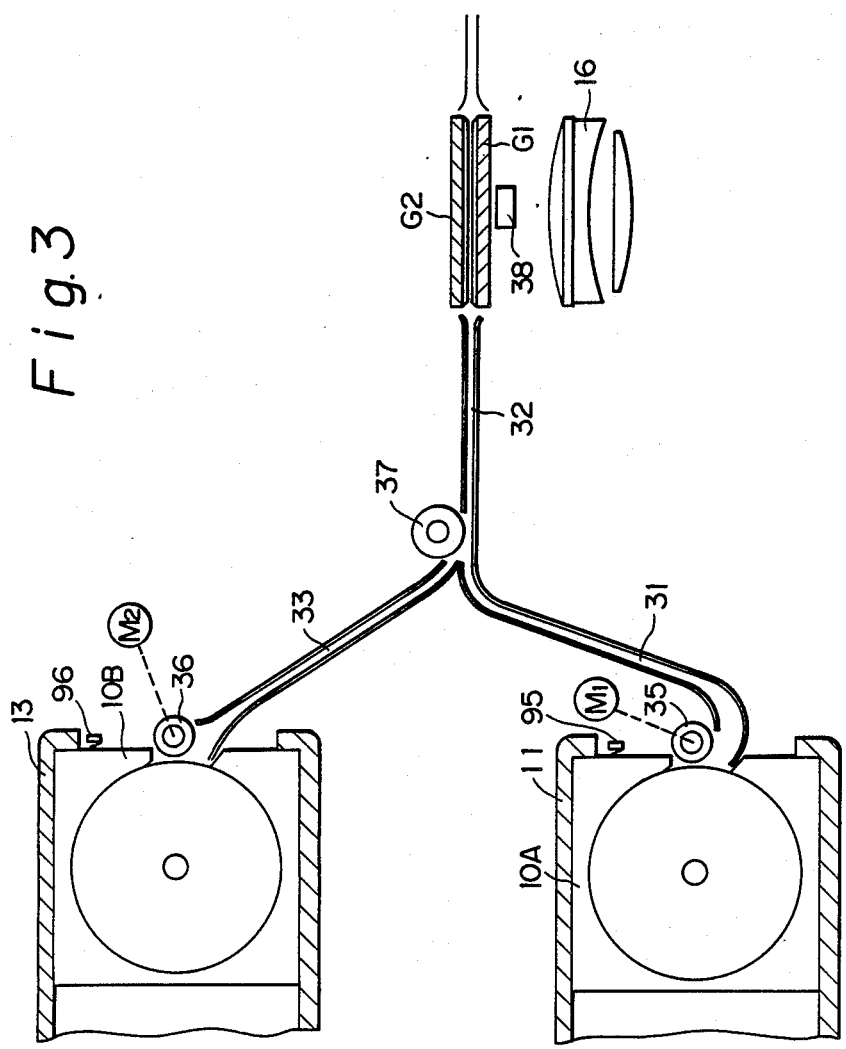
FIG. 3 is a side view showing a film feeding path.

FIG. 3 shows microfilm feeding paths. The microfilm in the first cartridge 10A passes through a first path 31 and then through a second path 32, and then passes between the glass plates G1 and G2 and is guided to the take-up reel 18, and the microfilm in the second cartridge 10B passes through a third path 33 and then through the second path 32, and passes between the glass plates G1 and G2 and is guided to the take-up reel 18. The first path 31 and the third path 33 merge with each other at the second path 32, and the microfilms from the cartridges 10A and 10B are selectively fed through the common second path 32.

A film guide plate is provided along each of the paths 31–33, and each film is guided along a predetermined path by the film guide plate. Reference numerals 35 and 36 designate film feeding-out rollers, reference numeral 37 denotes a film guide roller, and reference numeral 38 designates a mark detector.

The film feeding-out roller 35 is coupled to a motor $M_1$ and is movable to a position at which it contacts the microfilm in the cartridge 10A placed in the first position and to a position at which it is spaced apart from said microfilm, by a first solenoid, not shown. The film feeding-out roller 36 is coupled to a motor $M_2$ and is movable to a position at which it contacts the microfilm in the cartridge 10B placed in the second position and to a position at which it is spaced apart from said microfilm, by a second solenoid, not shown.

Where the first cartridge 10A is used, the roller 35 is moved to the position at which it contacts the microfilm F in the cartridge 10A while being rotated by a retrieval instruction, and the leading end of the microfilm is fed out of the cartridge 10A by the roller 35 and this film F passes through the first path 31 and the second path 32 and is fed to the take up reel 18. The take-up reel 18 is driven by a motor when the retrieval instruction is given, and automatically takes up the leading end of the film when the leading end of the microfilm is fed to the take-up reel. When the leading end of the microfilm is wound on the take-up reel 18, the rotation of the roller 35 is stopped and the roller 35 is moved to the position at which it is spaced apart from the film. Thereafter, the film is drawn out of the first cartridge by the rotation of the take-up reel and is taken up by the take-up reel. When the microfilm is to be rewound into the cartridge 10A, the film winding core in the cartridge 10A is rotatively driven in the take-up direction by a motor, not shown.

Where the second cartridge 10B is used, the roller 36 is moved to the position at which it contacts the microfilm in the cartridge 10B while being rotated by a retrieval instruction, and the leading end of the microfilm is fed out of the cartridge 10B by the roller 36, and this film passes through the third path 33 and the second path 32 and is fed to the take-up reel 18 and is taken up by the take-up reel 18 in the same manner as previously described. When the leading end of the microfilm is wound on the take-up reel 18, the rotation of the roller 36 is stopped and the roller 36 is moved to the position at which it is spaced apart from the film. Thereafter, the film is drawn out of the second cartridge by the rotation of the take-up reel and is taken up by the take-up reel. When the microfilm is to be rewound into the cartridge 10B, the film winding core in the cartridge 10B is rotatively driven in the take-up direction by a motor, not shown.

The mark detector 38 serves to detect a count mark attached to one side edge of each frame of the microfilm and comprises a photoelectric conversion element disposed at that side of the film which is opposite from the illuminating portion 15. The marks of the microfilm differ in concentration from the surroundings, and the light entering the detector 38 when the microfilm is fed is interrupted by the marks, whereby mark detection signals are put out from the mark detector 38. The mark detection signals put out when the mark detector detects the marks are counted by a counting portion, and the count value of the counting portion is compared with the address number of a desired frame and when the two agree with each other, the film is stopped, whereby the desired frame can be retrieved and the retrieved frame is placed in the projection optical path. The details of this retrieving device are described in Japanese Patent Publication No. 15691/1980 and therefore need not be described herein.

Figure 4:
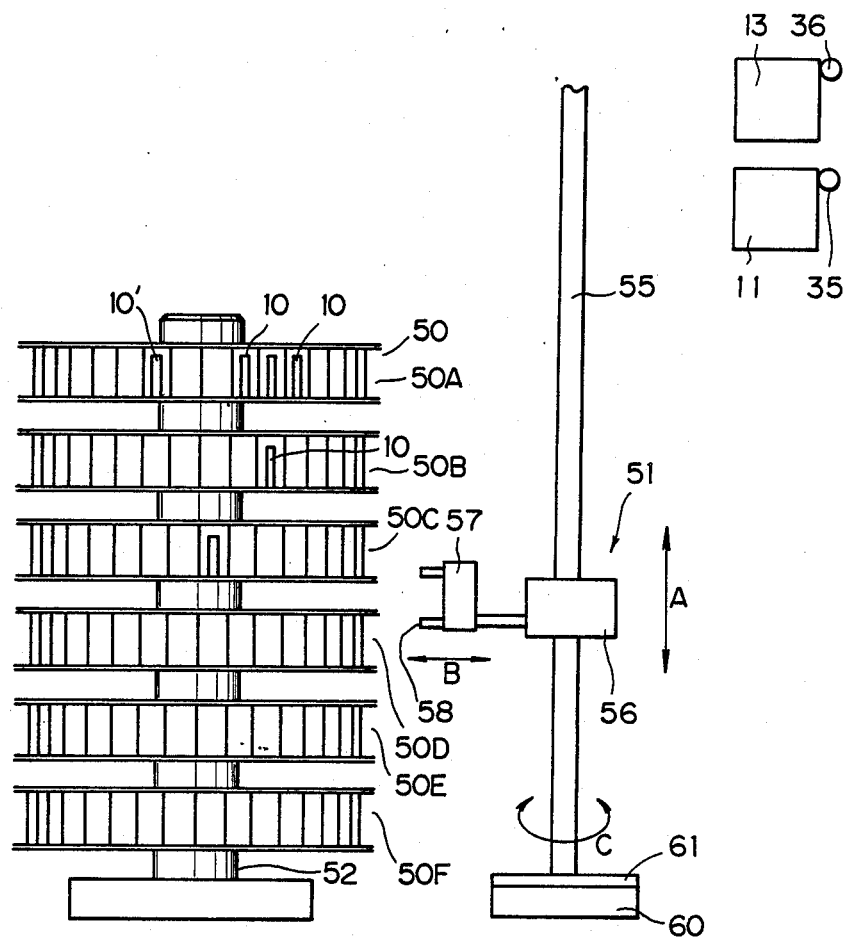
FIG. 4 is a side view showing the interior of a lower housing.

As shown in FIG. 4, within the lower housing 2, there are disposed a cartridge storing portion 50 containing a number of cartridges 10 therein, and a cartridge gripping and conveying mechanism 51 for selecting one of the cartridges in the storing portion 50 and conveying it to a first position or a second position.

Drums 50A–50F each containing a number of radially aligned cartridges 10 therein are piled at predetermined intervals in the cartridge storing portion 50, and each of the drums 50A–50F is adapted to rotate about a center shaft 52. These drums are of the same structure and each of them is provided with radially arranged compartments for containing the cartridges separately therein.

The cartridge gripping and conveying mechanism 51 has a lift member 56 movable up and down in the directions of bilateral arrow A along a pole 55 vertically disposed near the cartridge storing portion 50. A movable member 57 disposed on the lift member 56 is adapted to move back and forth in horizontal directions (the directions of bilateral arrow B) on the lift member 56. A hand 58 disposed on the fore end of the movable member 57 is adapted to grip the cartridge 10. The lift member 56 is movable up and down in the directions of bilateral arrow A from the top to bottom of the pole 55. The movable member 57 is reciprocally movable between a forward movement terminus position in which it can grip the cartridge in the storing portion 50 by the hand 58 and a backward movement terminus position in which it positions the cartridge gripped by the hand outside the storing portion 50. The pole 55 is rotatable in both directions about its axis, and by the pole 55 being rotated, the hand 58 can be made to face the storing portion 50 and face the first and second cartridge receiving members 11 and 13. The hand 58, as shown in FIG. 2, is of a claw structure capable of gripping the cartridge contained in the storing portion 50 and is adapted to grip and liberate the cartridge.

In the above-described construction, the movable member 57 is initially in the backward movement terminus position shown in FIG. 4, the hand 58 is opposed to the storing portion 50 and the lift member 56 is in its home position corresponding to the bottom or the intermediate portion of the pole 55.

The lift member 56 is connected to a motor through a wire, not shown, and when the motor is driven, the lift member 56 is moved up and down through the wire and, when the lift member 56 reaches a predetermined position, the motor is stopped and the lift member 56 is held stopped at a predetermined height position by the wire. This motor comprises a step motor and when the motor is stopped, a power is supplied to the motor so that the lift member is held at the predetermined height position. A brake may be mechanically applied to the wire so as to hold the lift member at the predetermined height position.

The pole 55 is rotatably supported on a base plate 60, and a shock absorbing member 61 is provided on the upper portion of the base plate 60. The shock absorbing member 61 is formed of an elastic material such as polyurethane foamed material or silicon rubber.

A spring may be used as the shock absorbing member. This shock absorbing member 61 is positioned below the lift member 56 so as to absorb the shock by the lift member 56 and thereby prevent the lift member from being damaged when the lift member 56 falls by an accident. The movable member 57 and the hand 58 overlie the lift member 56 and therefore, the shock absorbing member may be provided only below the lift member, but where the movable member 57 or the hand 58 underlies the lift member, it would be necessary to provide the shock absorbing member below the movable member or the hand.

When the number of a desired cartridge (the first cartridge 10A) and the number of a desired frame in this cartridge are input to the keyboard of the operating board 3 and the initiation of retrieval is instructed, the lift member 56 is moved up or down to the position of a drum containing the desired cartridge therein and the drum is rotated. When the compartment containing the desired cartridge therein reaches a position in which the hand 58 can grip the desired cartridge, the rotation of the drum is stopped and the desired cartridge comes to face the hand 58. The movable member 57 is then moved to the forward movement terminus position and, when the hand 58 bears against the desired cartridge 10A, the hand is operated to grip that cartridge. After the cartridge has been gripped, the movable member 57 is moved backwardly and when the movable member 57 reaches the backward movement terminus position, the lift member 56 is moved up and the pole 55 is rotated by 180°. By the 180° rotation of the pole 55, the hand 58 is made to face the cartridge receiving members 11 and 13. When the lift member 56 is moved up to a position in which it faces the first cartridge receiving member 11, the lift member is stopped. Subsequently, the movable member 57 is moved forwardly, and the first cartridge 10A gripped by the hand is charged into the first cartridge receiving member 11 and held at the first position. When the first cartridge 10A is held by the first cartridge receiving member 11, the hand 58 liberates the first cartridge.

Subsequently, the feeding-out roller 35 contacts the microfilm in the first cartridge 10A placed at the first position while rotating and feeds the microfilm out of the cartridge, whereby a desired frame in the microfilm is retrieved.

When the number of a desired cartridge (the second cartridge 10B) to be used next time and the number of a desired frame in this cartridge are input to the keyboard of the operating board 3 and the initiation of retrieval is instructed while the film of the first cartridge is retrieved, the hand 58 liberates the first cartridge 10A, whereafter the movable member 57 is moved backwardly, and then the pole 56 is rotated by 180° in the opposite direction, the lift member 51 is moved down and further the drums in the storing portion 50 are rotated. Thereafter, the same operation as that previously described takes place. That is, the hand 58 grips the second cartridge 10B to be used next time, whereafter the lift member 56 is moved up and the pole 55 is rotated by 180°. When the lift member 56 is moved up to a position in which it faces the second cartridge receiving member 13, the lift member is stopped. Subsequently, the movable member 57 is moved forwardly, and the second cartridge 10B gripped by the hand is charged into the second cartridge receiving member 13 and held at the second position. When the second cartridge 10B is held by the second cartridge receiving member 13, the hand 58 liberates the second cartridge. Accordingly, the second cartridge to be used next time can be selected and conveyed to the second position while the first cartridge is used.

When rewinding is instructed after the microfilm F of the first cartridge 10A has been utilized in the reader portion or the printer portion, the microfilm F is rewound into the cartridge 10A and, after the rewinding is terminated, the lift member 56 which has so far faced the second cartridge receiving member 13 is moved down to the position in which it faces the first cartridge receiving member 11 and, when the lift member 56 comes to face the first cartridge receiving member 11, the movable member 57 is moved forwardly and the hand 58 grips the used first cartridge 10A, and then the movable member 57 is moved backwardly. Subsequently, the pole 55 is rotated by 180° and the lift member 56 is moved down, and the drums are rotated. When the lift member 56 is moved down to the position of the drum into which the first cartridge 10A is to be returned and the drum is rotated to a position in which the predetermined compartment thereof faces the hand 58, the movable member 57 is moved forwardly and the used first cartridge is returned into the original compartment. If an instruction for retrieving the third cartridge to be used next to the second cartridge 10B is given after or during this return, the operation as described above is repeated and the third cartridge can be charged into the then empty cartridge receiving member (in this case, the first cartridge receiving member 11).

On the other hand, when the rewinding of the microfilm into the first cartridge 10A is terminated, the feeding-out roller 36 contacts the microfilm in the second cartridge 10B placed at the second position while being rotated and feeds the microfilm out of the cartridge, and the retrieving of the desired frame is effected.

When the microfilm is rewound into the second cartridge after the microfilm of the second cartridge has been used, the third cartridge to be used next time is charged into the first cartridge receiving member 13, whereafter the second cartridge is returned into the predetermined compartment of the drum by the cartridge gripping and conveying mechanism 51. Thus, during the time that the microfilm of a cartridge is used in the projecting portion, the cartridge to be used next time can be selected and conveyed to the projecting portion and the cartridge to be used next time can be prepared at a utilizable position and the used cartridge can be returned. Accordingly, during the time that the microfilm of a desired cartridge is utilized or the used cartridge is returned, the microfilm of the cartridge to be used next time can be utilized and therefore, the projecting apparatus can be used efficiently.

In the above-described embodiment, there are provided two cartridge receiving members, but alternatively, three or more cartridge receiving members may be provided so that a cartridge may be selectively conveyed into each cartridge receiving member by cartridge conveying means and the cartridge held by each cartridge receiving member may be selectively fed to a common path.

The mechanism for selecting the cartridges contained in the storing portion is not restricted to the shown embodiment, but may be a conventional cartridge selecting mechanism.

Figure 5:
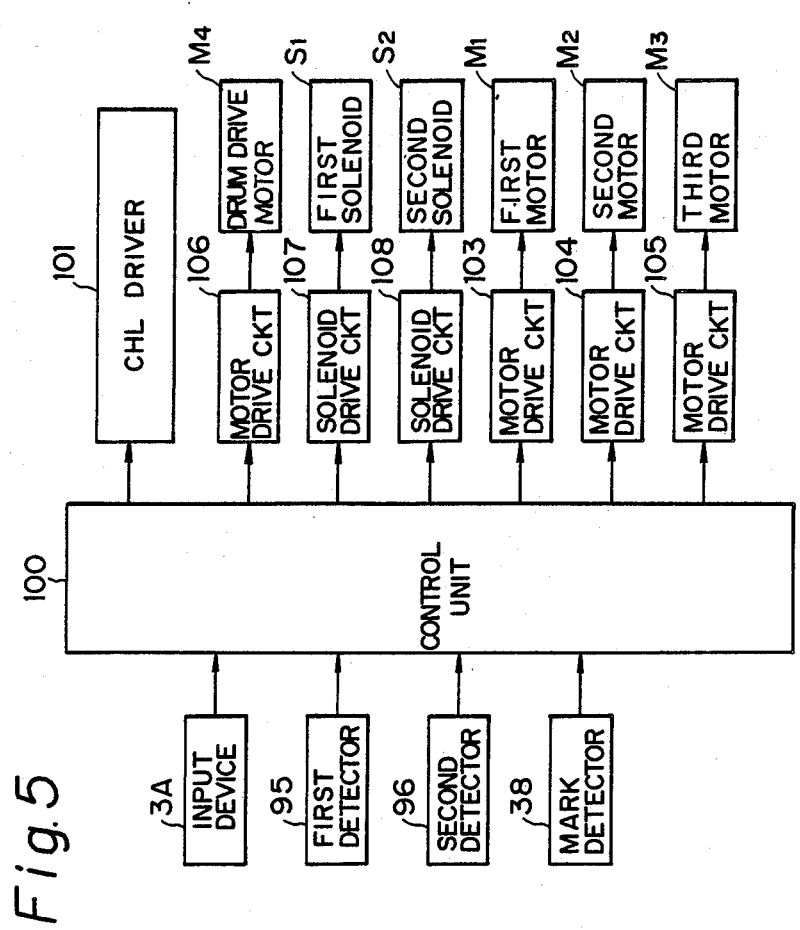
FIG. 5 is a block diagram of a retrieval control circuit.
Figure 6:
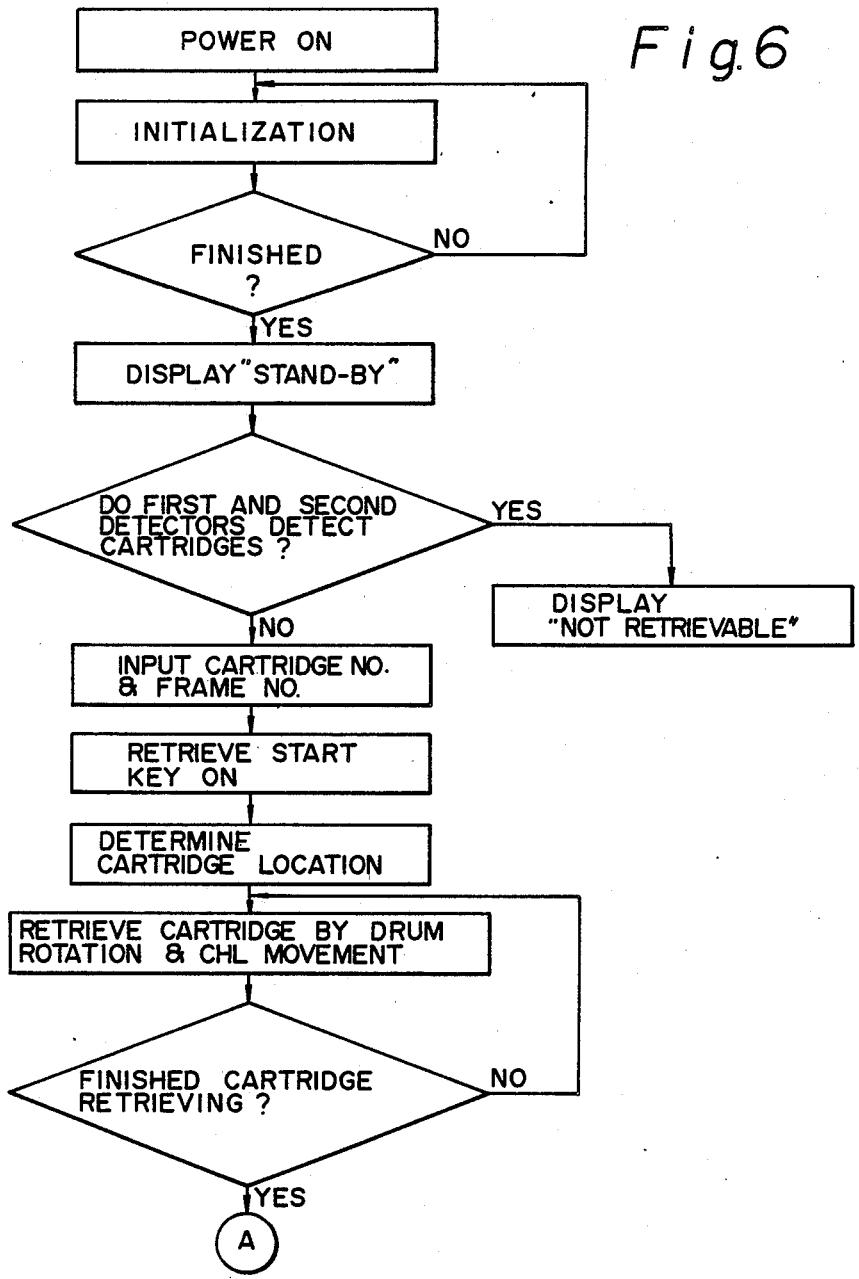
FIGS. 6 to 9 are flow charts of the operation of the apparatus of the present invention.
Figure 7:
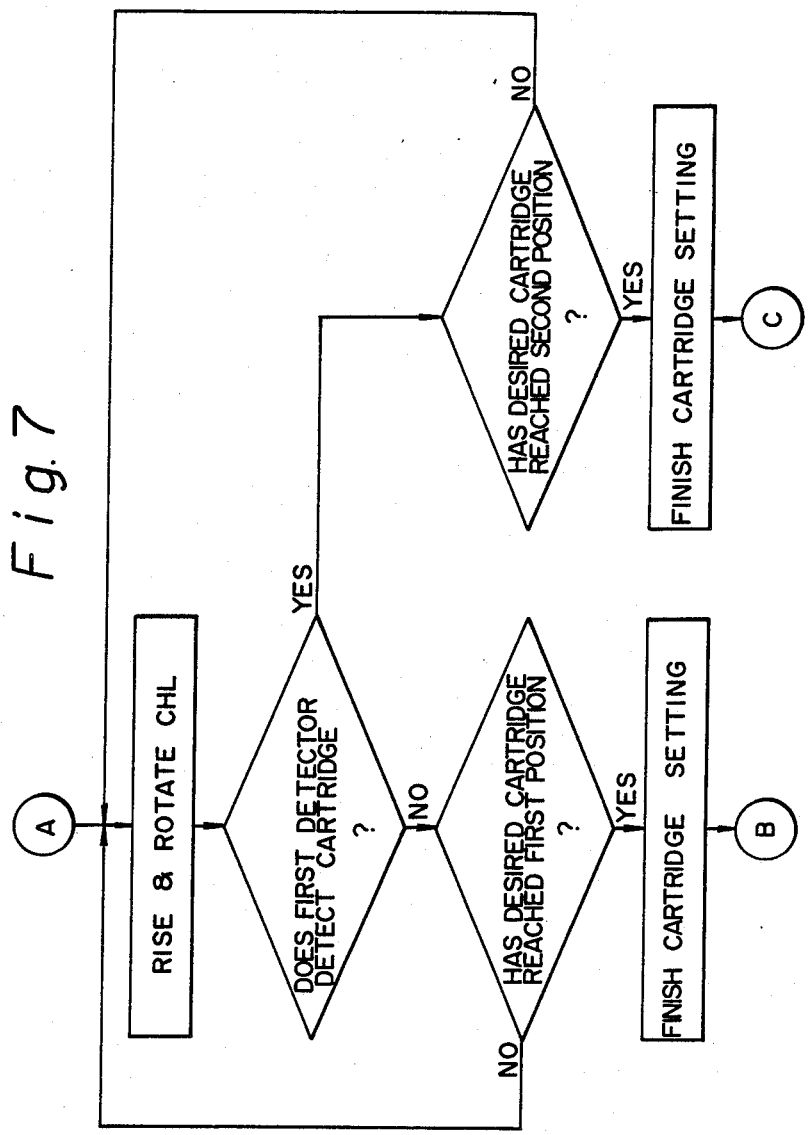

Referring now to FIG. 5 which is a block diagram of the retrieval control circuit of the above-described apparatus, reference character 3A designates an input device disposed on the operating board 3 and having a main switch, a ten-key, a retrieval initiation instructing key, a print key, a rewind key, etc.

Reference numeral 95 denotes a first detector for detecting whether a cartridge is present at the first position, and reference numeral 96 designates a second detector for detecting whether a cartridge is present at the second position. The first and second detectors 95 and 96 each comprise, for example, a microswitch, and detect cartridges and put out cartridge detection signals when the cartridges are mounted in the first and second cartridge receiving members 11 and 13 as shown in FIG. 3.

Reference numeral 100 designates a control unit comprising a microcomputer. The control unit 100 has a central processing unit (CPU), an ROM as a program memory, and an RAM as a data memory, and operates various driving portions in a predetermined order or effects various operations in accordance with the program stored in the ROM. Also, the control unit 100 discriminates the presence or absence of a mark on the basis of the output signal of the mark detector 38, and the signal put out when a mark is detected is counted by a counting unit.

Reference numeral 101 denotes a driver for driving CHL 51. $M_1$ designates a first motor for driving the feeding-out roller 35, $M_2$ denotes a second motor for driving the feeding-out roller 36, $M_3$ designates a third motor for driving the take-up reel 18, $M_4$ denotes a drum driving motor for rotating the drums 50A–50F in the storing portion 50, $S_1$ designates a first solenoid for moving the feeding-out roller 35 to the position in which it contacts the film and the position in which it is spaced apart from the film, and $S_2$ denotes a second solenoid for moving the film feeding-out roller 36 to the position in which it contacts the film and the position in which it is spaced apart from the film. Reference numerals 103–106 designate motor driving circuits for controlling the motors connected thereto, and reference numerals 107 and 108 denote solenoid driving circuits for controlling the solenoids connected thereto.

The first and second solenoids $S_1$ and $S_2$, when energized, move the feeding-out rollers 35 and 36 coupled thereto to the positions in which they contact the films, and when deenergized, move the rollers 35 and 36 to the positions in which they are spaced apart from the films.

FIGS. 6 to 9 are flow charts of the operation of the above-described apparatus. When the main switch is closed at step 1, the drums 50A–50F are rotated at step 2 and placed at a rotational angle position of a predetermined home position, and CHL 51 is driven and placed at a predetermined home position (the initial setting operation), and the apparatus assumes its stand-by position (step 4).

The program then proceeds to step 5, at which whether the first and second detectors 95 and 96 detect cartridges is examined, and when at least one detector does not detect a cartridge, that is, when a cartridge is not placed at the first position or (and) the second position, the program proceeds to step 6. When the first and second detectors 95 and 96 detect cartridges at step 5, the program proceeds to step 5', and it is displayed that the retrieving of a new cartridge is impossible. That is, when cartridges are placed at the first position and the second position, new cartridges cannot be conveyed to the first position and the second position and the retrieving of new cartridges becomes impossible.

At step 6, the number of a desired cartridge and the number of a desired frame are input by the ten-key of the input device 3A, and then at step 7, the retrieval initiating key is depressed.

At step 8, the control unit 100 operates on the basis of the input cartridge number the row of shelf or the level of the drum in which the desired cartridge is present, and rotates the drums 50A–50F on the basis of the operated value and drives CHL 51, and retrieves the desired cartridge (step 9). When the desired cartridge is retrieved (step 10) and gripped by the hand 58, the lift member 56 is moved up and the movable member 57 is rotated (step 11). Subsequently, at step 12, whether the first detector 95 detects a cartridge is examined and, when the first detector 95 does not detect a cartridge, the program proceeds to step 13, and when the first detector 95 detects a cartridge, the program proceeds to step 30. When the first detector 95 does not detect a cartridge, the lift member 56 is moved up so that the desired cartridge gripped by the hand 58 is conveyed to the first position, and when the desired cartridge arrives at the first position, the first detector 95 detects a cartridge and the desired cartridge is mounted into the first cartridge receiving member 11 and the mounting is terminated (step 14).

Figure 8:
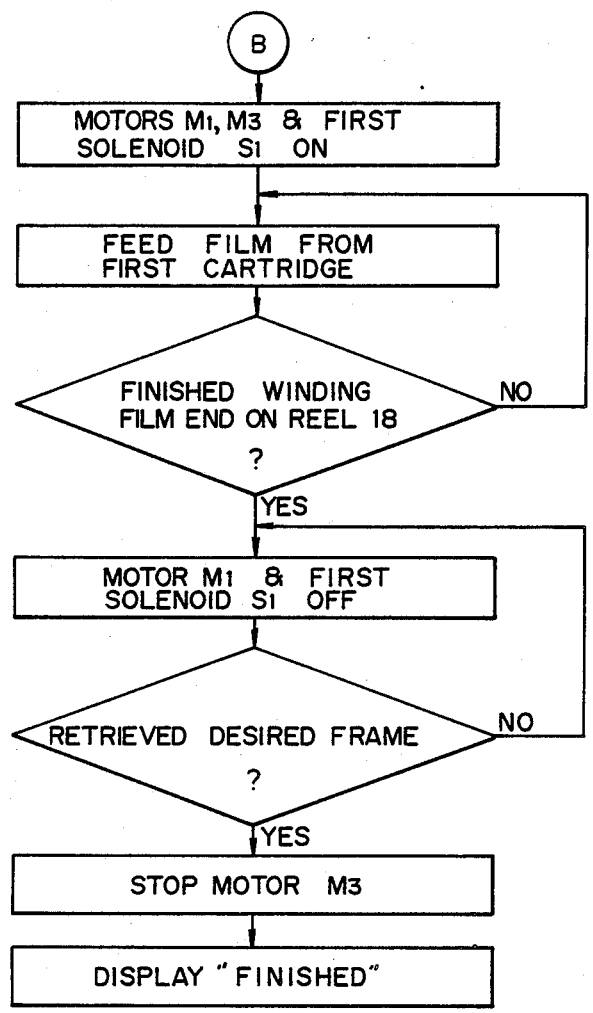
Figure 9:
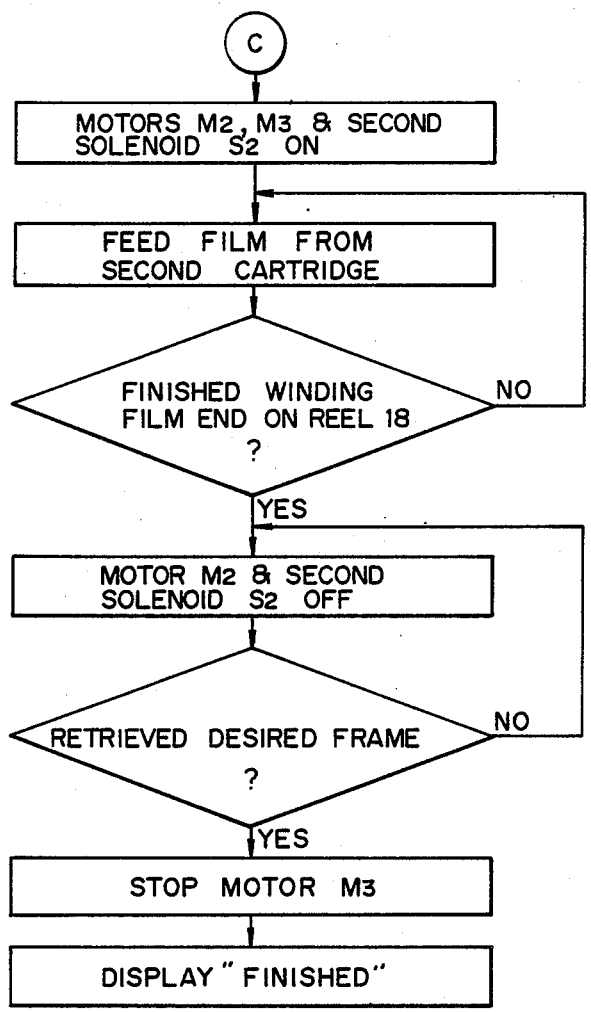

The program then proceeds to step 15 shown in FIG. 8, and the motors $M_1$, $M_3$ and the first solenoid $S_1$ are energized, and the feeding-out roller 35 comes into contact with the film of the cartridge 10 and feeds out the film (step 16). When the leading end of the film is wound on the take-up reel 18 (step 17), the motor $M_1$ and the first solenoid $S_1$ are deenergized (step 18). The motor $M_3$ continues to revolve and the film is continuedly fed to the take-up reel 18. When the desired frame is retrieved at step 19, the motor $M_3$ is stopped at step 20 and the film is stopped, and the retrieving operation is terminated (step 21). At this time, the desired frame is projected onto the screen and the image of this frame is read on the screen. When the rewind key of the input device 3A is depressed after this frame has been utilized in the projecting portion, an unshown motor coupled to the film winding core of the cartridge is driven, whereby the film is rewound into the cartridge 10 placed at the first position. After the termination of the rewinding, CHL 51 is operated by an operation converse to what has been previously described, and the used cartridge is returned into the original drum.

On the other hand, when the first detector 95 has detected a cartridge at step 12, the program proceeds to step 30, and the lift member 56 is moved up so that the desired cartridge gripped by the hand 58 is conveyed to the second position, and when the desired cartridge arrives at the second position, the second detector 96 detects a cartridge and the desired cartridge is mounted into the second cartridge receiving member 13, and the mounting is terminated (step 31). The program then proceeds to step 32 shown in FIG. 9, and the motors $M_2$, $M_3$ and the second solenoid $S_2$ are energized and the feeding-out roller 36 comes into contact with the film of the cartridge and feeds out the film (step 33). When the film is wound on the take-up reel 18 (step 34), the motor $M_2$ and the second solenoid $S_2$ are deenergized (step 35). The motor $M_3$ continues to revolve and the film is continuedly fed to the take-up reel 18. When the desired frame is retrieved at step 36, the motor $M_3$ is stopped at step 37 and the film is stopped, and the retrieving operation is terminated (step 38). At this time, the desired frame is projected onto the screen and the image of this frame is read on the screen. When the rewind key of the input device 3A is depressed after this frame has been utilized in the projecting portion, the unshown motor coupled to the film winding core of the cartridge is driven, whereby the film is rewound into the cartridge placed at the second position.

Now, in FIG. 4, a cleaning cartridge 10' is contained in a predetermined compartment of the uppermost drum 50A. The cleaning cartridge 10' is constructed into the same shape as the film cartridge 10 containing a microfilm therein, and contains a roll of cleaning tape (or film) therein. The cleaning cartridge 10', like the film cartridge 10, is gripped by the hand 58 and conveyed to the first position or the second position.

At least one cleaning cartridge 10' is stored in the storing portion 50.

The cleaning tape in the cartridge 10' comprises a tacky tape, and a layer of tacky agent is provided on one side (or both sides) of the long tape. The tacky tape is of a structure comprising a layer of tacky agent provided on a base member, and the base member may be paper or plastic tape. The tacky agent may be a rubber tacky agent composed chiefly of natural rubber or synthetic rubber, an acrylic tacky agent composed chiefly of polyvinyl ether or polyacryl ester, a vinyl tacky agent composed chiefly of vinyl chloride/vinyl acetate copolymer of vinyl acetate polymer, or a silicon tacky agent.

The tacky tape may be made as by applying to a base member tape a ground agent comprising a mixture of natural rubber and polyvinyl alcohol, and applying thereto a tacky agent comprising a mixture of natural rubber, terpene resin (softening agent) and a petroleum oil content. The tacky agent may be one having suitable tackiness at a normal temperature, and more particularly, a tacky agent which will permit the tacky tape adhering to the feeding rollers, the film guide rollers or the film guide plates to be stripped off therefrom with a relatively small force and which has relatively weak tackiness enough to permit dust or the like adhering to the surface of the rollers or the like to stick to the tacky agent when the tacky tape is stripped off may be selected. The non-tacky side (back side) of the tacky tape is subjected to a peel-off treatment so that when the tape is wound, the layer of tacky agent may be prevented from shifting to the back side of the tape and that the feeding-out and rewinding of the tape can be accomplished easily.

Where the cleaning cartridge 10' is used, the address number of the cleaning cartridge 10' is input to the keyboard of the operating board 3 and the initiation of the retrieving is instructed, whereupon an operation similar to what has been previously described is repeated, whereby the cleaning cartridge 10' is mounted into the cartridge receiving member 11 or 13, and then the cleaning tape in the cartridge 10' is fed to the take-up reel 18.

When the cleaning tape in the cartridge 10' is fed to the take-up reel 18, the cleaning tape comes into contact with the rollers 35, 36, 37, the glass plates G1, G2 and the film guide plates and at this time, dust or the like adhering to the surfaces of these rollers, glass plates and guide plates now sticks to the cleaning tape and thus, the feeding path is automatically cleaned.

The tackiness of the tacky tape is appropriately set so that during the movement of the tape, the tacky tape does not strongly stick to the rollers, etc. to hamper the conveyance of the tape. Also, the tacky tape may be attached to a support tape by means of a both-side tacky tape having tackiness stronger than that of the tacky agent of the tacky tape so that the cleaning tacky tape may be interchangeably attached to the support tape and when the tackiness of the cleaning tacky tape is reduced or the tacky tape is contaminated, this tacky tape may be stripped off and a new cleaning tacky tape may be attached to the support tape. The length of the cleaning tape may be set as desired.

When the rewinding is instructed after the termination of the cleaning, the cleaning cartridge 10' is returned to its original place in the storing portion 50 in the same manner as previously described.

A first cleaning cartridge containing therein a cleaning tape provided with a layer of tacky agent on the outer side thereof and a second cleaning cartridge containing therein a cleaning tape provided with a layer of tacky agent on the inner side thereof may be contained in the storing portion 50 and these two cleaning cartridges may be alternately used to clean the both sides of the feeding path. A both-side tacky tape may also be used, but in this case, in order that the tacky agents on the both sides may not stick to each other, the layers of tacky agent on the both sides may be intermittently provided lengthwisely of the tape so that the layers of tacky agent on the both sides may not contact each other when the tape is wound.

Figure 10:
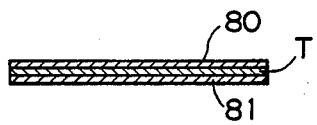
FIG. 10 is a cross-sectional view of a cleaning tape.

Referring to FIG. 10 which shows another embodiment of the cleaning tape contained in the cleaning cartridge, cleaning members 80 and 81 are provided on the both sides of the tape T. The cleaning members 80 and 81 are formed of a material such as velvet, velveteen or hair having a soft brush-like surface and come into contact with the film guide plates and glass plates to automatically clean their surfaces when they move.

Alternatively, the cleaning tape may be formed of an insulative material and this tape may be electrically charged by a charger so that the static electricity on the tape may attract dust or the like to thereby clean the path.

What we claim is:

1. An information handling apparatus for use with a plurality of cartridges each containing an information recording medium, said apparatus comprising:
   information processing means for processing information on information recording media contained in the cartridges;
   first and second cartridge holding means for holding individual cartridges;
   first and second information transfer means for transferring the recording media between cartridges held by said first and second holding means, respectively, and said information processing means;
   means for alternatively operating said first and second transfer means;
   cartridge storing means for storing a plurality of the cartridges;
   cartridge transporting means for selectively transporting individual cartridges from said cartridge storing means to said first cartridge holding means or said second cartridge holding means;
   detecting means for detecting whether each of said first and second cartridge holding means holds a cartridge; and
   control means for controlling said cartridge transporting means on the basis of an output of said detecting means, said control means inhibiting said cartridge transporting means from operating when said detecting means detects a cartridge in each of said first and second cartridge holding means, and releasing the inhibition of operation to transport the cartridge to said cartridge holding means when said detecting means detects the absence of a cartridge in at least one of said first and second cartridge holding means.

2. An information handling apparatus according to claim 1, wherein said cartridge storing means includes a support base for storing the plurality of cartridges thereon, and means for moving said support base.

3. An information handling apparatus according to claim 2, wherein said cartridge transporting means includes gripping means capable of removably mounting said cartridges with respect to said cartridge storing means, and moving means for moving said gripping means toward said first and second cartridge holding means.

4. An information handling apparatus according to claim 1, wherein said information transfer means comprises a first path for guiding the recording medium of a cartridge held by said first cartridge holding means, a second path for guiding the recording medium of a cartridge held by said second cartridge holding means, said first and second paths merge with each other at a third path so that the recording medium of the cartridge held by said first cartridge holding means or the cartridge held by said second cartridge holding means is conveyer through said third path, and said information processing means is located along said third path.

5. An information handling apparatus according to claim 4, further having take-up means for taking up the recording medium fed to said third path.

6. An information handling apparatus according to claim 1, wherein said apparatus has a first housing and a second housing separable from each other, said cartridge storing means being located at said first housing, and said first and second cartridge holding means, said first and second information transfer means and said information processing means being located at said second housing, and wherein said cartridge transporting means transports a cartridge between the first and the second housings.

7. An information handling apparatus according to claim 1, wherein said information processing means includes optical means for projecting the information recorded on the recording medium and a screen for observing the projected information.

8. An information handling apparatus according to claim 1, wherein said information processing means includes reading means for reading the information of the recording mediums and converting it into an electrical signal, and reproducing means for reproducing the information on the basis of said electrical signal.

9. An information handling apparatus according to claim 1, wherein the recording mediums are microfilms.

10. An information handling apparatus according to claim 1, wherein said information processing means includes retrieving means for retrieving desired information recorded on the recording medium and positioning the retrieved information at a projecting means.

11. An information handling apparatus according to claim 1, wherein said storing means is capable of storing a cleaning cartridge with a cleaning tape, said cleaning cartridge being transported to said first and second holding means by said cartridge transporting means, and then said cleaning tape being transferred to said processing means by said information transfer means.

12. An information handling apparatus according to claim 11, wherein a cleaning member is provided on at least one surface of said cleaning tape.

13. An information handling apparatus according to claim 12, wherein said cleaning member is a tacky agent.

14. An information handling apparatus according to claim 12, wherein said cleaning member is a brush-like member.

15. An information handling apparatus according to claim 11, wherein said cleaning tape is formed of an electrically insulative material.

16. An information handling apparatus according to claim 1, wherein an elastic material is provided below said cartridge transporting means.

17. An apparatus for retrieving and displaying information, comprising:
   a storage chamber for storing a plurality of receptacles which hold an information recording medium;
   receptacle transporting means for transporting a receptacle selected from said storage chamber to either a first position or a second position, and for returning the receptacle from the first or the second position to said storage chamber;
   retrieving means for transporting the information recording medium from a receptacle held at either the first position or the second position and for retrieving information recorded on the information recording medium;
   display means for displaying the information retrieved by said retrieving means;
   detecting means for detecting whether the receptacles are held at said first and second positions, respectively; and
   control means for controlling said receptacle transporting means on the basis of an output of said detecting means, said control means inhibiting said receptacle transporting means from operating when said detecting means detects a receptacle in each of the first and second positions, and releasing the inhibition of operation to transport the receptacle to either one or both of the first and second positions where no receptacle is held when said detecting means detects the absence of a receptacle in at least one of the positions.

18. An apparatus according to claim 17, wherein said retrieving means includes illuminating means for illuminating the recording medium, photoelectric converting means for receiving the light from the information recorded on the recording medium, and reproducing means for reproducing the information on the basis of an electric signal put out from said photoelectric converting basis.

19. An apparatus according to claim 17, wherein said retrieving means includes first transporting means for transporting to a predetermined position the recording medium for a receptacle placed at said first position, and second transporting means or transporting to said predetermined position the recording medium of a receptacle placed at said second position.

20. An apparatus according to claim 17, wherein said apparatus has a first housing and a second housing separable from each other, said storage chamber being located at this first housing, said retrieving means and said displaying means being located at said second housing, and wherein said receptacle transporting means transport the receptacle between the first and the second housing.

21. An information handling apparatus according to claim 1,
wherein at least one cleaning cartridge which holds a cleaning tape bearing no information is included in the plurality of cartridges, and said first and second information transfer means transfer the cleaning tape to said information processing means.

22. An information reading apparatus according to claim 21, wherein a cleaning member is provided on at least one surface of said cleaning tape.

23. An information reading apparatus according to claim 22, wherein said cleaning member is a tacky agent.

24. An information reading apparatus according to claim 22, wherein said cleaning member is a brush-like member.

25. An information reading apparatus according to claim 22, wherein said cleaning tape is formed of an electrically insulative material.

* * * * *

UNITED STATES PATENT AND TRADEMARK OFFICE
CERTIFICATE OF CORRECTION

PATENT NO. : 4,938,586

DATED : July 3, 1990

INVENTOR(S) : Yoshihiko Hirose, et al.

It is certified that error appears in the above-identified patent and that said Letters Patent is hereby corrected as shown below:

ON THE TITLE PAGE,
[30] FOREIGN APPLICATION PRIORITY DATA:

"Dec. 13, 1984 [JP] Japan.... 59-275548" should read --Dec. 25, 1984 [JP] Japan.... 59-275548--.

ON THE TITLE PAGE,
[75] INVENTORS:

"Yoshiko Hirose," should read --Yoshihiko Hirose,--.

ON THE TITLE PAGE,
[57] ABSTRACT:

Line 3, "cartridge" should read --cartridges--.

Line 6, "cartride" should read --cartridge--.

COLUMN 6:

Line 67, "member 13," should read --member 11,--.

COLUMN 11:

Line 56, "conveyer" should read --conveyed--.

COLUMN 12:

Line 11, "mediums" should read --media--.

Line 15, "mediums" should read --media--.

UNITED STATES PATENT AND TRADEMARK OFFICE
CERTIFICATE OF CORRECTION

PATENT NO. : 4,938,586          Page 2 of 2

DATED : July 3, 1990

INVENTOR(S) : Yoshihiko Hirose, et al.

It is certified that error appears in the above-identified patent and that said Letters Patent is hereby corrected as shown below:

COLUMN 13:

Line 17, "or" should read --for--.

Line 23, "this" should read --said--.

Signed and Sealed this

Thirtieth Day of June, 1992

Attest:

DOUGLAS B. COMER

Attesting Officer     Acting Commissioner of Patents and Trademarks